M. DIENER & C. F. URBAN.
SLEIGH.
APPLICATION FILED NOV. 14, 1910.
1,026,023.
Patented May 14, 1912.
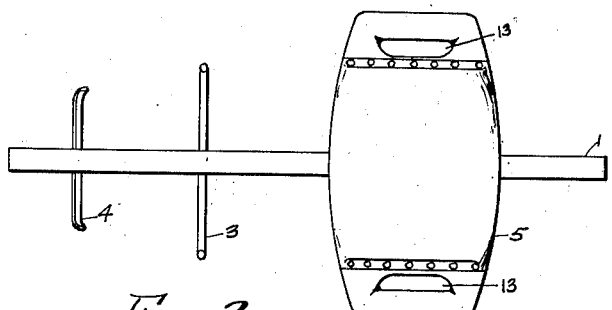
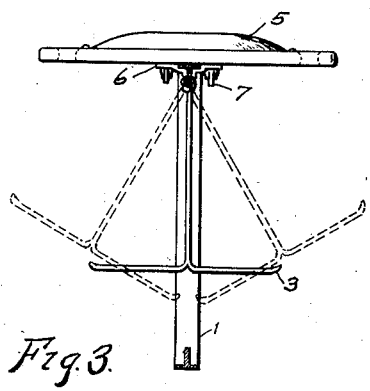
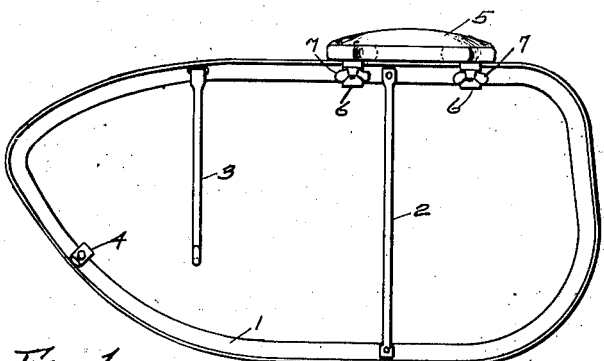
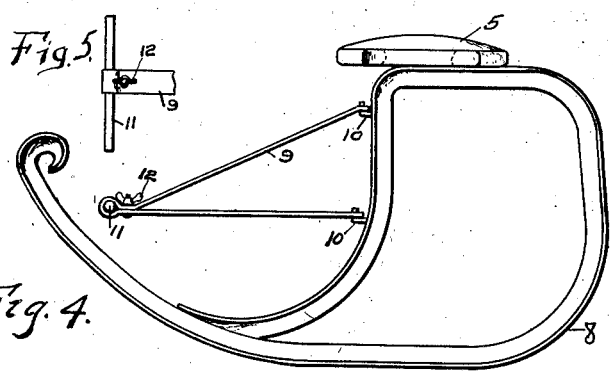
WITNESSES:
INVENTORS

UNITED STATES PATENT OFFICE.

MAGDALENA DIENER AND CHARLES FREDOLIN URBAN, OF MILWAUKEE, WISCONSIN.

SLEIGH.

1,026,023.

Specification of Letters Patent.   Patented May 14, 1912.

Application filed November 14, 1910. Serial No. 592,403.

*To all whom it may concern:*

Be it known that we, MAGDALENA DIENER, a citizen of the United States, and CHARLES FREDOLIN URBAN, a citizen of the Republic of Switzerland, both residents of 831 Sycamore street, Milwaukee, in the county of Milwaukee and the State of Wisconsin, have invented a new and useful Sleigh, of which the following is a specification.
This invention has for its object to provide a sleigh or coasting device comprising a single runner having a comparatively short bearing surface with curved ends which facilitate the turning of the runner beneath the rider for steering purposes and for assuring an easy landing after making leaps when coasting down irregular surfaces.

Another object of this invention is to provide such a coasting device with a foot rest which will assist the rider in maintaining equilibrium.

Another object of this invention is to provide such a coasting device of strong and durable construction, while being inexpensive to construct and of light weight and easily carried from place to place.

With the above and other objects in view the invention consists in the sleigh as herein claimed and all equivalents.

Referring to the accompanying drawings in which like characters of reference indicate the same parts in the different views: Figure 1 is a side elevation of a coasting device constructed in accordance with this invention and illustrating the preferred form thereof; Fig. 2 is a plan view thereof; Fig. 3 is a front elevation thereof with the runner in section and showing by dotted lines the movements of the swinging foot rest; Fig. 4 is a side elevation of a modified form of the invention adapted for use by ladies; and, Fig. 5 is a detail plan view of the swinging foot rest thereof.
In these drawings 1 indicates the runner frame which is preferably of light T-iron, as shown, and is bent to a substantially oval shape with its two ends brought together and welded or riveted or otherwise firmly united and 2 indicates a strengthening brace rod extending transversely across the frame with its ends riveted to the flanges of the frame to prevent the possibility of the frame collapsing on striking the ground after a long leap. Some distance in front of the brace the flange of the runner frame is provided with an opening into which is engaged the hooked upper end of a T-shaped foot rest 3 which is thus suspended and free to swing from side to side as shown by dotted lines in Fig. 3. Another foot rest 4 is adjustably and detachably clamped to the flange of the runner frame and is employed by the more experienced riders for assisting in swinging the frame beneath the rider for steering.

A seat 5 is adjustably and removably mounted on the runner frame by having clips 6 fitting around the flange of the frame and held to the seat by winged nuts 7 and while the nuts are loose, the seat may be moved along the runner frame to position it properly, according to the angularity of the descent to be made. This seat is desirably padded at its middle portion and is provided with openings 13 at the ends to form hand holds which are grasped by the rider.

In use the rider sits upon the seat and firmly grasps the hand holds at each side with his weight resting upon the device and with his feet on the ground to hold him upright, he starts the descent by taking a few steps and then as soon as he has acquired enough momentum to enable him to maintain equilibrium, he places both feet upon one of the foot rests and continues the descent. The device is kept beneath the rider by his pulling upon one or the other of the hand holds so as to tilt it one way or the other as required and when it is desired to turn to avoid obstruction or for steering a desired course, the rider leans to one side or the other so as to throw his weight out of equilibrium and at the same time swings the runner beneath him on a vertical axis by pushing forward with one hand and pulling rearward with the other.

While running on a smooth surface, either horizontal or inclined, the runner rides on a flat surface which is approximately one-third of its entire length. In order that the runner may easily pass up and down irregularities in its course, its bearing surface is curved at a varying pitch which has been found in practice to be most desirable for leaping as being capable of landing successfully, whatever point of the bearing surface the runner is the first to strike. These leaps are made of great length, the rider acquiring a high speed in a descent and then quickly turning up a short incline so that his momentum will carry him many yards. It is obvious that after such a leap the runner may again land on an incline or a decline or a level surface and it is of utmost importance that wherever the runner may first strike, it will present a smooth bearing surface capable of supporting the rider. It is for this reason that the curvature at the front end of the runner occupies nearly half the length of the device while the curvature at the rear is of sufficient extent to right the position of the device after a leap which is ended upon a further decline. The short comparatively straight portion of the bearing surface of the runner is of further advantage in that it is positioned directly beneath the seat and offers much less resistance to the turning movement thereof for steering purposes than would be true if it were longer.

That form of the invention shown in Figs. 4 and 5 is designed for ladies' use, the oval shape of the frame 1 being departed from while the shape of the bearing portion of the runner remains the same. In fact the frame 8 beginning at the front end follows the same outline as the frame 1 until after the seat is passed, when it turns abruptly downwardly and meets the runner just in advance of the straight portion thereof. Thus the downwardly bent portion takes the place of the brace 2 of the other construction and leaves the frame open in front of the seat to accommodate the skirts of the rider. As this portion of the frame is open, the footrest cannot be suspended as before and consequently it takes the form of a bracket 9 pivotally mounted on hooks 10 on this downwardly bent portion of the frame, the bracket carrying a cross piece 11 at its end held by a clamping screw 12. This form of the invention is operated in the same manner as the other. When desired the bracket footrest (9) may be provided for that form of the invention shown in Figs. 1, 2 and 3, the bracket being pivotally attached to the brace (2) in the same manner as it is attached to the downwardly bent portion of the frame in Fig. 4.

The swinging foot rests are more particularly used by beginners to enable them to more readily throw their weight from one side to the other to maintain equilibrium, but with experienced riders this becomes an acquired accomplishment and then the fixed or adjustable foot rest 4 is preferred as being more effective for assisting in bracing the body when making long leaps. The seat and foot rests are made detachable so as to be capable of being packed within the frame for shipment or for carrying the device from place to place.

What we claim as new and desire to secure by Letters Patent is:

1. A coasting device, comprising a single runner frame of T-iron having an oval shape with comparatively straight parallel top and bottom portions, the bottom portion forming a straight bearing surface of approximately one-third the length of the frame with a rounded front end and the top portion forming a seat support, a transversely extending seat adjustably mounted on the straight top portion of the frame and clamped thereto, said top portion of the frame also affording a support for a swinging foot rest in front of the seat support, a swinging foot rest suspended therefrom, and the rounded front of the bottom portion of the frame affording a support for a foot rest, and a foot rest adjustably mounted thereon.

2. A coasting device, comprising a frame of T-iron having an oval shape with approximately parallel top and bottom portions, a seat adjustably clamped to the top portion of the frame, a brace connecting the top and bottom portions of the frame beneath the seat, and a bracket foot rest pivotally mounted on the brace.

MAGDALENA DIENER.
CHARLES FREDOLIN URBAN.

Witnesses:
 FRANK L. TENNEY,
 TONY OELBERGER.